(No Model.)
G. R. BOWEN.
PLANT FOR GENERATING ELECTRICITY.
No. 544,654. Patented Aug. 20, 1895.
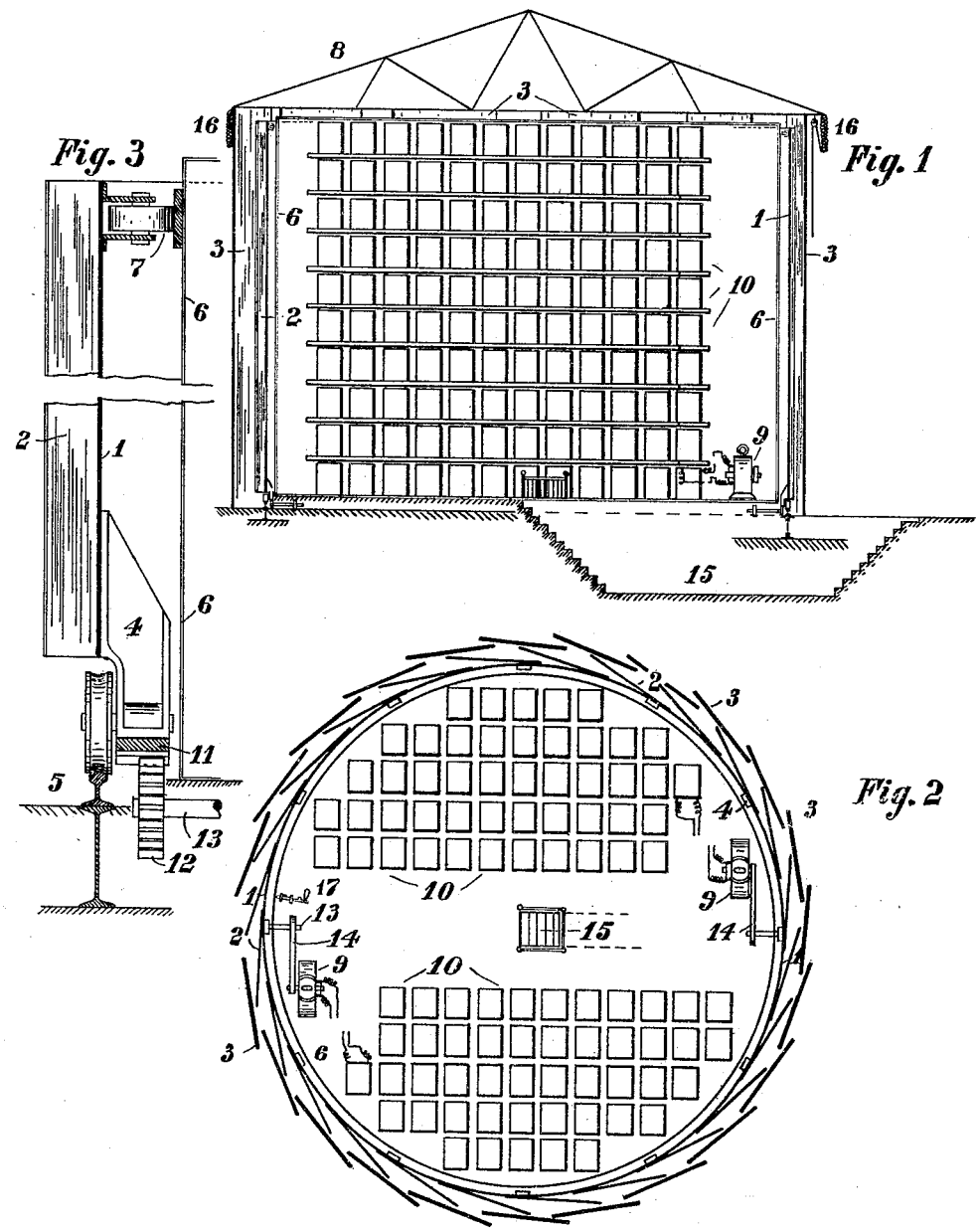
WITNESSES:
K. M. Gilligan.
W. C. H. Slagle
INVENTOR
George R. Bowen
BY
Augustus B. Stoughton
ATTORNEY

UNITED STATES PATENT OFFICE.

GEORGE R. BOWEN, OF SAN ANTONIO, TEXAS, ASSIGNOR OF ONE-HALF TO WILLIAM WARREN GIBBS, OF PHILADELPHIA, PENNSYLVANIA.

PLANT FOR GENERATING ELECTRICITY.

SPECIFICATION forming part of Letters Patent No. 544,654, dated August 20, 1895.

Application filed February 21, 1895. Serial No. 539,204. (No model.)

*To all whom it may concern:*

Be it known that I, GEORGE R. BOWEN, a citizen of the United States, residing at San Antonio, in the county of Bexar and State of Texas, have invented certain new and useful Improvements in Plants or Houses for Generating Electricity, of which the following is a specification.

One object of my present invention is to provide a simple, durable, compact, and reliable plant, house, or means operated by the force and energy of the wind without supervision or attention, and generating electricity and storing the same for use; and to this end my invention consists of the improvements hereinafter described and claimed.

The nature, characteristic features, and scope of my invention will be more fully understood from the following description, taken in connection with the accompanying drawings, forming part hereof, and in which—

Figure 1 is a sectional view exemplifying a plant or house embodying features of my invention, and constructed for generating electricity by the force of the wind and for storing the same. Fig. 2 is a sectional plan of the same, and Fig. 3 is a detail view drawn to an enlarged scale and illustrating some of the parts shown at the left-hand side of Fig. 1.

In the drawings, 1 is a revoluble cylinder resembling a roundhouse or cyclorama, and constructed imperforate—*i. e.*, in such manner that no wind can pass horizontally through it—for purposes to be hereinafter explained. This cylinder 1 is provided upon its periphery with perpendicularly-ranging blades or paddles 2, which project or stand out tangentially, or substantially so, from the cylinder. Outside of the paddles or blades 2 are a series of fixed vanes or guides 3, arranged in a circle and disposed tangentially, or, in other words, at substantially the same angle as the paddles or blades 2. These vanes or guides 3 slightly overlap each other and direct the wind onto the inner blades 2 of the cylinder 1, at one side thereof, while on the opposite side they shield the returning blades from the force of the wind, and thus the wind circling around these outer vanes or guides and between the ground or base at the bottom and the roof at the top assists in the rotation of the cylinder 1, which is due to the tangential action of the wind rather than to the impact thereof. Inasmuch as the cylinder 1 is solid between the blades or paddles 2, the wind or current of air is confined between the outer guides 3 and the air-tight or imperforate cylinder 1, and acts tangentially upon the blades or paddles 2 around the circumference of the cylinder. Moreover, the force of this wind or current of air is received, as it were, at the long end of a lever—*i. e.*, near the ends of the blades or paddles—and this will cause the cylinder to be rotated by even a very gentle wind.

In the exemplification of my invention shown in the drawings the cylinder 1 is provided at its base with brackets 4, Fig. 3, having wheels that run upon a circular track or way 5, and use is made of a fixed inner circular wall 6, which not only acts as a guide for wheels 7 at the top of cylinder 1, but also serves a purpose to be presently mentioned.

However, this wall 6 may be dispensed with, and a central pole or other known means may be employed for guiding the top of the cylinder 1. The roof 8 is supported upon the vanes or guides 3 and upon a center pole, if present, or in any convenient manner. Within the cylinder 1 are located dynamo-electric machines or their equivalents 9, that supply current to charge storage-batteries 10, from which the current is taken, as required, for any use. The movement of the cylinder 1 is utilized for driving the dynamos 9. As shown in the drawings, this result is accomplished by means of a rack 11, carried by the cylinder 1 and meshing with a pinion 12, applied to a shaft 13, having a pulley for driving the dynamo through the intervention of a belt 14.

From the foregoing description it is apparent that the interior of the cylinder 1 constitutes a factory or dynamo-room, and that the wall 6, when present, shields anyone in this room from the annoyance and danger of the rotating cylinder. Ingress and egress to this room is or may be provided by means of the stairways 15, or in any convenient manner. Normally the wind circles between the vanes or guides 3 and the imperforate cylinder 1, and, acting tangentially upon the blades or paddles 2, causes rotation of the cylinder 1, which in turn drives the dynamos and results in the generation and storage of electricity. If for any reason it is desired to arrest or check the rotation of the cylinder 1, this result may be accomplished in a variety of ways. For example, a curtain 16, Fig. 1, may be lowered by means of pulleys and cords over the vanes 3, thus excluding the wind, or the blades 2 may be turned flush with the cylinder 1, and a locking device 17 may be employed for attaching the parts 1 and 6 to restrain the former.

It will be obvious to those skilled in the art to which my invention relates that modifications may be made in details of arrangement without departing from the spirit thereof. Hence I do not limit myself to the precise construction and arrangement of parts hereinabove set forth, and illustrated in the drawings; but,

Having thus described the nature and objects of my present invention, what I claim as new, and desire to secure by Letters Patent, is—

1. The combination of, an imperforate cylinder rotatable around an upright axis and provided with vertical tangentially disposed blades, a series of upright tangentially disposed guides or vanes fixed in the ground or to a base and arranged around said blades or paddles, and a roof overlying said guides or vanes and blades or paddles, substantially as described.

2. The combination of, an imperforate cylinder rotatable around an upright axis and provided with vertical tangentially disposed blades, a series of upright tangentially disposed guides or vanes fixed in the ground or to a base and arranged around said blades or paddles, a roof overlying said guides or vanes and blades or paddles, electrical apparatus within said cylinder, and means for imparting motion from said cylinder to said electrical apparatus, substantially as described.

In testimony whereof I have hereunto signed my name.

GEO. R. BOWEN.

Witnesses:
SAM. P. MABRY,
J. C. NELSON.